US008296048B2

(12) United States Patent
Henderson et al.

(10) Patent No.: US 8,296,048 B2
(45) Date of Patent: Oct. 23, 2012

(54) VEHICLE INFORMATION SYSTEM

(75) Inventors: Chris Henderson, Belleville, MI (US); Daryl Smith, Howell, MI (US)

(73) Assignee: Nissan North America, Inc., Franklin, TN (US)

( * ) Notice: Subject to any disclaimer, the term of this patent is extended or adjusted under 35 U.S.C. 154(b) by 307 days.

(21) Appl. No.: 12/723,231

(22) Filed: Mar. 12, 2010

(65) Prior Publication Data

US 2011/0224894 A1 Sep. 15, 2011

(51) Int. Cl.
G06F 19/00 (2011.01)
B60Q 1/00 (2006.01)
B60K 15/00 (2006.01)
G01F 9/00 (2006.01)
G01F 9/02 (2006.01)
G01L 3/26 (2006.01)
G01M 15/00 (2006.01)

(52) U.S. Cl. ........ 701/123; 340/438; 340/439; 180/69.4; 73/114.52; 73/114.53

(58) Field of Classification Search .......... 340/438–439; 180/69.4; 701/123; 73/114.52, 114.53
See application file for complete search history.

(56) References Cited

U.S. PATENT DOCUMENTS

| 4,046,998 | A | 9/1977 | Kuno et al. |
| 4,157,030 | A | 6/1979 | Keely |
| 4,217,644 | A | 8/1980 | Kato et al. |
| 4,400,779 | A | 8/1983 | Kosuge et al. |
| 4,845,630 | A * | 7/1989 | Stephens ........................ 701/123 |
| 5,301,113 | A * | 4/1994 | To et al. ......................... 701/123 |
| 5,693,876 | A * | 12/1997 | Ghitea et al. ................ 73/114.53 |
| 6,453,731 | B1 * | 9/2002 | Yaegashi .................... 73/114.52 |
| 6,467,337 | B2 | 10/2002 | Sadahiro et al. |
| 6,961,656 | B2 * | 11/2005 | Kim ............................... 701/123 |
| 2005/0209771 | A1 * | 9/2005 | Ishiguro ........................ 701/123 |
| 2007/0247291 | A1 * | 10/2007 | Masuda et al. ................ 340/439 |
| 2007/0256481 | A1 * | 11/2007 | Nishiyama et al. ............. 73/113 |
| 2011/0093187 | A1 * | 4/2011 | Skaff et al. ..................... 701/123 |

* cited by examiner

Primary Examiner — Ryan Zeender
Assistant Examiner — Allen Chein
(74) Attorney, Agent, or Firm — Global IP Counselors, LLP

(57) ABSTRACT

A vehicle information system operating method performs operations comprising determining an operational period, determining a movement period, determining a modification factor, determining a fuel economy value and determining an adjusted fuel economy value. The determining of the operational period determines the operational period during which a vehicle is running. The determining of the movement period determines the movement period during which the vehicle is in motion. The determining of the modification factor determines the modification factor based on respective durations of the operational period and the movement period. The determining of the fuel economy value determines the fuel economy value associated with the operational period. The determining of the adjusted fuel economy value determines the adjusted fuel economy value based on the fuel economy value and the modification factor.

18 Claims, 4 Drawing Sheets

VEHICLE INFORMATION SYSTEM

CROSS-REFERENCE TO RELATED APPLICATION

Related subject matter is disclosed in copending U.S. patent application Ser. No. 12/701,638, filed on Feb. 8, 2010. The entire disclosure of U.S. patent application Ser. No. 12/701,638 is hereby incorporated herein by reference.

BACKGROUND

1. Field of the Invention

The present invention generally relates to a vehicle information system operating method. More specifically, the present invention relates to a vehicle information system operating method that reliably determines fuel economy of the vehicle.

2. Background Information

Vehicles are increasingly providing useful data to drivers such as a distance-to-empty (DTE) reading. A DTE value is defined as simply an estimated distance that a vehicle can travel before running out of fuel. Typically, the DTE value is determined based on the current volume of fuel in the fuel tank as well as the fuel economy of the vehicle. Fuel economy is typically either a fixed value for a vehicle or determined based on fuel consumption during a recent period of time or over a set distance of travel. Typically, fixed values are considered to be highly unreliable for many reasons. For instance, subtle differences in fuel economy may exist even between vehicles of the same model. Also, a vehicle's fuel economy performance may change over time.

Although a running calculation of fuel economy can be more accurate than a fixed value, factors can also affect the reliability of this calculation. For example, once a vehicle is started, the vehicle consumes fuel whether or not the vehicle is moving. Therefore, significant swings and variations in the computed fuel economy can occur depending on whether fuel economy is updated at set time intervals or after set distances of travel. These variations can result in fluctuations in DTE value, which can cause driver confusion since one would not expect fuel economy to shift dramatically during a relatively modest period of vehicle operation.

One example of a vehicle information system is disclosed in U.S. Pat. No. 4,046,998, in which a vehicle information system determines an amount of fuel consumed during a specific time period based on a quantity of fuel processed by a fuel injection system, and then outputs a distance-to-empty value that was determined based on a current driving condition. Some other examples of vehicle information systems that output DTE readings are disclosed in the following U.S. publications: U.S. Pat. No. 4,157,030; U.S. Pat. No. 4,217,644; U.S. Pat. No. 4,400,779; U.S. Pat. No. 5,301,113; and U.S. Pat. No. 6,467,337.

SUMMARY

It has been discovered that with conventional vehicle technology, driving habits and/or driving conditions can contribute to fluctuations in fuel economy. In many prior vehicle information systems, these fluctuations in fuel economy can result in the DTE value going up and/or down quicker proportionally than a rate at which the vehicle is traveling. This situation may be confusing for some drivers.

In view of the state of known technology, one aspect of the present invention is to provide a vehicle information system operating method that comprises determining an operational period, determining a movement period, determining a modification factor, determining a fuel economy value and determining an adjusted fuel economy value. The determining of the operational period determines the operational period during which a vehicle is running. The determining of the movement period determines the movement period during which the vehicle is in motion. The determining of the modification factor determines the modification factor based on respective durations of the operational period and the movement period. The determining of the fuel economy value determines the fuel economy value associated with the operational period. The determining of the adjusted fuel economy value determines the adjusted fuel economy value based on the fuel economy value and the modification factor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
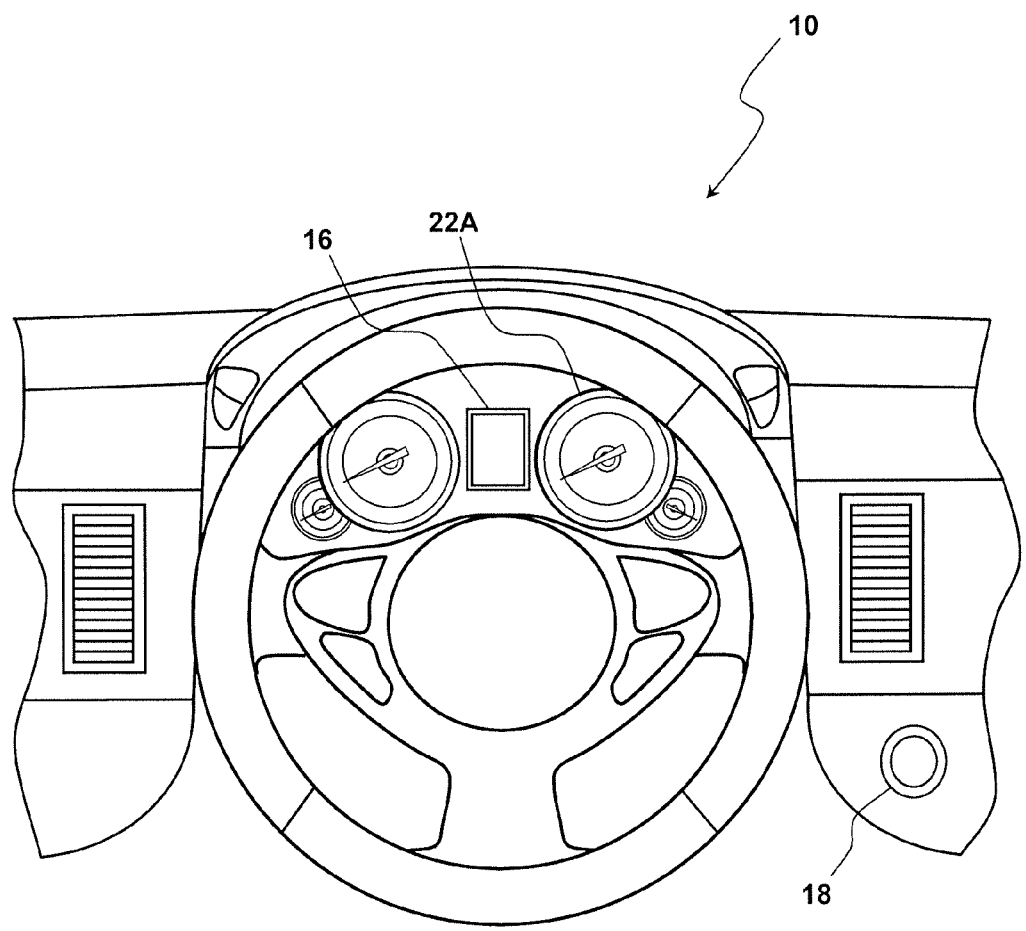
FIG. 1 is an interior view of a portion of a vehicle that is equipped with a vehicle information system in accordance with an illustrated embodiment.
Figure 2:
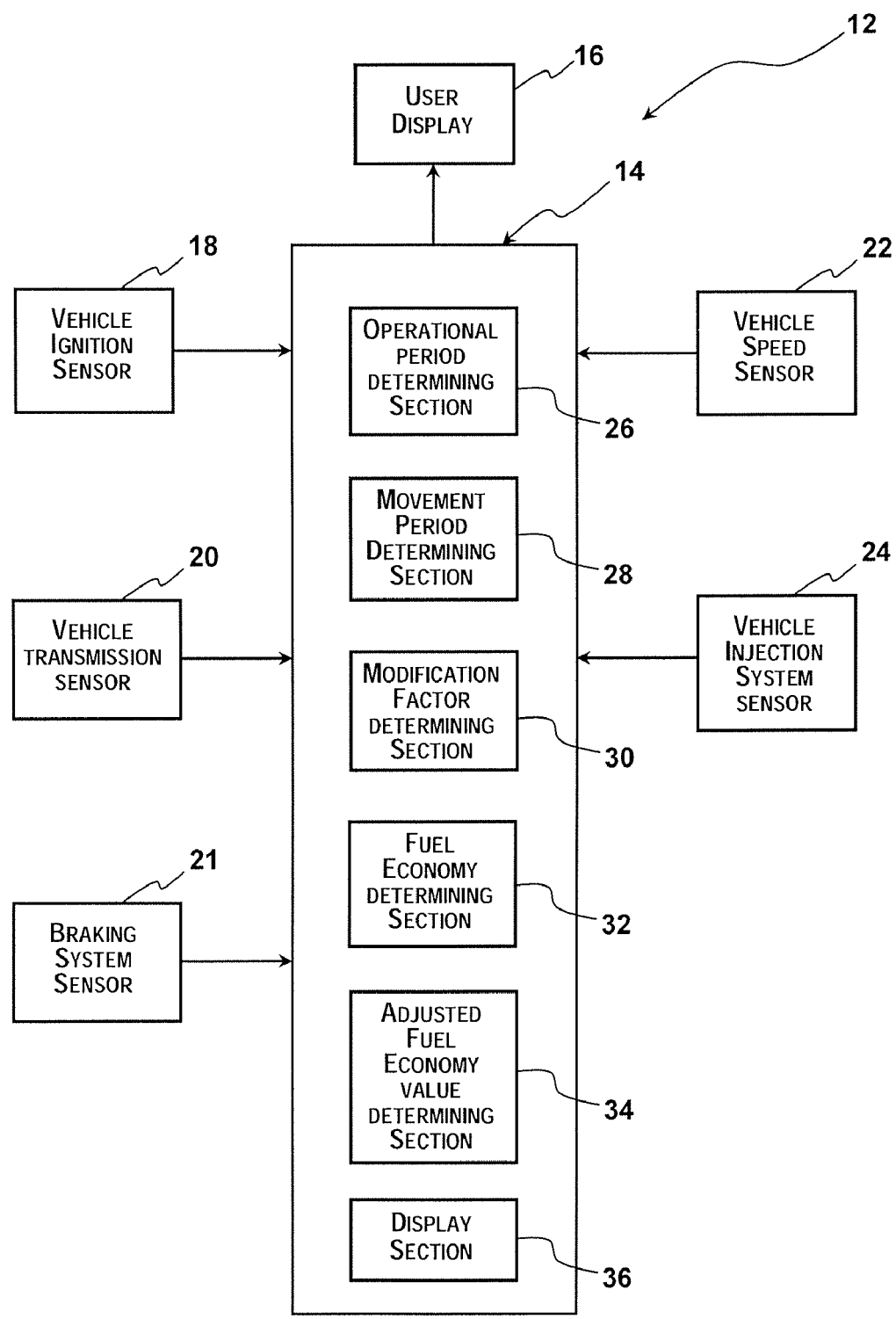
FIG. 2 is a high-level block diagram of the vehicle information system that includes, among other things, a vehicle information controller and various sensors.

Referring initially to FIG. 1, a portion of a vehicle 10 is illustrated that displays a fuel economy reading and/or a distance-to-empty (DTE) reading in accordance with one embodiment. Fuel economy is generally defined as the distance the vehicle 10 can travel per unit volume of fuel. For example, a displayed fuel economy value may be recomputed and updated once every 1 km of travel. An estimated DTE value is an estimated distance that the vehicle 10 can travel before running out of fuel. For example, a displayed DTE value may be recomputed and updated once every 30 seconds. FIG. 2 is a diagrammatic illustration of an exemplary vehicle occupant information system 12 for the vehicle 10 shown in FIG. 1. The vehicle information system 12 mainly includes a vehicle information system controller 14, a user display 16, a vehicle ignition sensor 18, a vehicle transmission sensor 20, a braking system sensor 21, a vehicle speed sensor 22 and a vehicle injection system sensor 24. The vehicle information system 12 may receive one or more signals through a controller area network (CAN) or by any other communications means.

The vehicle information system controller 14 preferably includes a microcomputer with a vehicle information system control program that controls the sections of the vehicle information system controller 14 as discussed below. The vehicle information system controller 14 can also include other conventional components such as an input interface circuit, an output interface circuit, and storage devices such as a ROM (Read Only Memory) device and a RAM (Random Access Memory) device. The vehicle information system controller 14 is operatively coupled to the components of the vehicle information system 10 as discussed herein in a conventional manner. The internal RAM of the vehicle information system controller 14 stores statuses of operational flags and various control data. The internal ROM of the vehicle information system controller 14 stores, for example, the control program. It will be apparent to those skilled in the art from this disclosure that the precise structure and algorithms for the vehicle information system controller 14 can be any combination of hardware and software that will carry out the functions of the embodiments of the present invention.

The vehicle information system controller 14 is operatively connected to the vehicle ignition sensor 18 such that the vehicle ignition sensor 18 enables operation of the vehicle information system controller 14. In other words, when the vehicle ignition is turned to an "ON" position or an "accessory" position, electrical power from a battery (not shown) is supplied to the vehicle information system controller 14. Once the vehicle information system controller 14 is activated, the vehicle information system controller 14 selectively receives signals from the vehicle ignition sensor 18, the vehicle transmission sensor 20, the braking system sensor 21, the vehicle speed sensor 22 and the vehicle injection system sensor 24.

Figure 3:
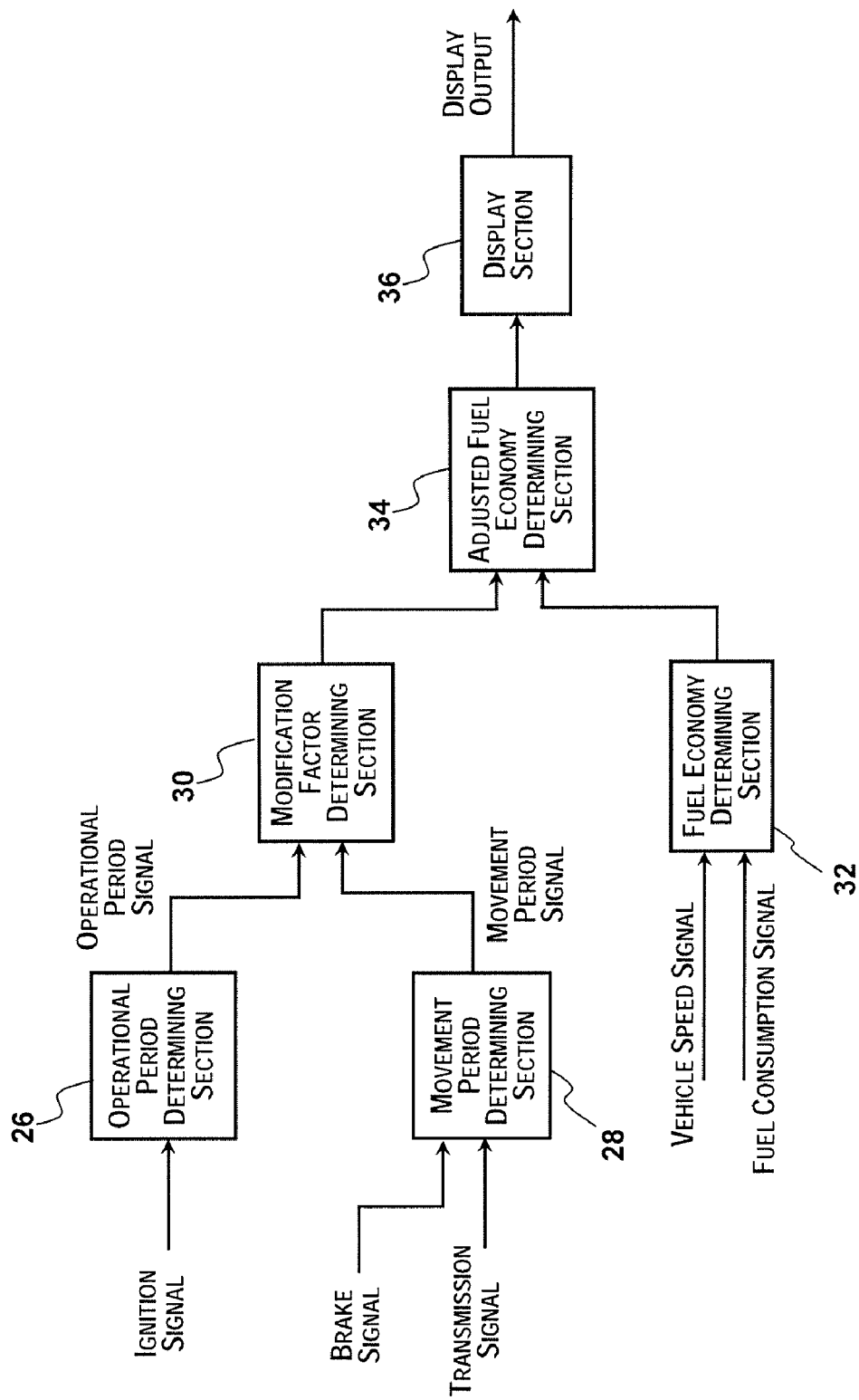
FIG. 3 is a functional block diagram of the vehicle information system that illustrates computation of an adjusted fuel economy value.

As shown in more detail in FIGS. 2 and 3, the vehicle information system controller 14 includes an operational period determining section 26, a movement period determining section 28, a modification factor determining section 30, a fuel economy determining section 32, an adjusted fuel economy value determining section 34 and a display section 36. According to an exemplary embodiment of the present invention, the adjusted fuel economy determining section 34 calculates an adjusted fuel economy of the vehicle 10 based on the following equation:

$$AFE_1 = AFE_0 + (FE - AFE_0)FE_{ADJ}$$

where:
$AFE_1$: current adjusted fuel economy value;
$AFE_0$: previous adjusted fuel economy value;
FE: current fuel economy; and
$FE_{ADJ}$: fuel economy modification factor.

As can be seen from the above equation, the fuel economy determining section 32 determines a fuel economy value (e.g., the current adjusted fuel economy value $AFE_1$) at least partially based on a difference between a current fuel economy value FE and a previous fuel economy value (e.g., the previous adjusted fuel economy value $AFE_0$). Also, the fuel economy determining section 32 can be characterized as limiting the difference between the current adjusted fuel economy value $AFE_1$ and the previous adjusted fuel economy value $AFE_0$ to a product of a fuel economy fluctuation (e.g., $FE - AFE_0$) and a modification factor (e.g., the fuel economy modification factor $FE_{ADJ}$).

The operational period determining section 26 receives an ignition signal from the vehicle ignition sensor 18 when the vehicle ignition is turned to an "ON" position and the vehicle's engine is started. The operational period determining section 26 includes a duration timer that is enabled once the engine is started. If the vehicle 10 was last turned off in the middle of a monitoring period established by the vehicle information system controller 14, then the duration timer continues to increment from its previous value at the time the vehicle 10 was turned off. For example, the vehicle information system controller 14 may begin a new monitoring period after every 1 km of travel by the vehicle 10. Whenever the vehicle information system controller 14 begins a new monitoring period, the duration timer is zeroed out and begins counting again. Accordingly, the time value of the duration timer represents an operational period corresponding to the duration of time that the vehicle 10 has been operating during the current monitoring period.

The movement period determining section 28 receives a transmission signal from the vehicle transmission sensor 20 indicating whether the vehicle transmission is in the "park" setting or is in one of the drive settings. Alternatively or additionally, the movement period determining section 28 receives a brake signal from the braking system sensor 21. For example, the brake signal may indicate a status of an emergency brake, especially in the case of a manual transmission, which would typically not have a "park" setting. The brake signal could also indicate a status of wheel brakes on the vehicle 10 in order to determine when the vehicle 10 is not parked but also not moving (e.g., at a stop light). The movement period determining section 28 includes a movement timer that is also enabled once the engine is started. Similarly to the duration timer, if the vehicle 10 was last turned off in the middle of a monitoring period established by the vehicle information system controller 14, the movement timer recovers its previous value at the time the vehicle 10 was turned off. Also, whenever the vehicle information system controller 14 begins a new monitoring period, the movement timer is zeroed out. However, unlike the duration timer, the movement timer only increments when the vehicle transmission 20 is shifted out of the "park" setting. Accordingly, the time value of the movement timer represents a movement period corresponding to the duration of time that the vehicle has likely been in motion (e.g., out of the "park" setting) during the current monitoring period. Alternatively or additionally, the movement timer may stop incrementing when the emergency brake is applied, even if the transmission 20 is shifted out of the "park" setting. Further, the movement timer could also be programmed to stop incrementing any time that the wheel brakes of the vehicle 10 are applied.

The modification factor determining section 30 receives an operational period signal from the operational period determining section 26 indicating the duration that the vehicle has been operating (i.e., the value of the duration timer), and a movement period signal from the movement period determining section 28 indicating the duration that the vehicle 10 has been in motion (i.e., the value of the movement timer), and determines a modification factor based on the respective durations of the operational period and the movement period. For example, the modification factor determining section 30 may calculate the fuel economy modification factor $FE_{ADJ}$ based on the following equation:

$$FE_{ADJ} = t_{MOV}/t_{DUR}$$

where:
$t_{MOV}$: value of the movement timer; and
$t_{DUR}$: value of the duration timer.

In other words, the fuel economy modification factor $FE_{ADJ}$ is equal to the fraction of time that the vehicle 10 was moving during a given monitoring period that took the time $t_{DUR}$ to complete. For example, given a monitoring period equal to 1 km of travel, a fuel economy modification factor of 50% indicates that the vehicle 10 was only moving during half of the time that it took for the vehicle 10 to travel 1 km. Those skilled in the art will appreciate that the above equation may be modified as desired to include one or more constants in order to fine tune determination of the current adjusted fuel economy $AFE_1$. For example, in order to make changes in the current adjusted fuel economy $AFE_1$ more gradual, the above equation for the fuel economy modification factor $FE_{ADJ}$ may be modified such that the value of the duration timer $t_{DUR}$ is multiplied by a constant such as, for example, 90.

The vehicle speed sensor 22 detects the speed of the vehicle 10. One example of the vehicle speed sensor 22 is a wheel-rotation-type sensor that detects the number of rotations of a wheel of the vehicle 10. However, other types of speed sensors may also be utilized. The vehicle speed sensor 22 generates a vehicle speed signal indicative of the vehicle speed, and sends the vehicle speed signal to the vehicle information system controller 14. The vehicle speed as measured by the vehicle speed sensor 24 is displayed by a speed gauge 22A on the vehicle's dashboard as seen in FIG. 1.

The vehicle injection system sensor 24 detects a consumed fuel volume by a fuel injection system of the vehicle 10. One example of the vehicle injection system sensor 24 is a fuel injection amount sensor that detects the amount of fuel being injected into the cylinders by the fuel injection system of the vehicle 10. The vehicle injection system sensor 24 generates a fuel consumption signal indicative of the consumed fuel volume, and sends the fuel consumption signal to the vehicle information system controller 14.

The fuel economy determining section 32 of the vehicle information system controller 14 receives the vehicle speed signal from the vehicle speed sensor 22 and the fuel consumption signal from the vehicle injection system sensor 24, and based those signals, determines a current fuel economy value associated with the operational period. For example, fuel economy determining section 32 may compute fuel economy by dividing the distance that the vehicle 10 traveled by the fuel that the vehicle 10 consumed during a given monitoring period.

In addition, instead of determining the fuel economy based on the fuel consumption signal from the vehicle injection system sensor 24, the fuel economy determining section 32 can receive a signal from the vehicle speed sensor 22 and a fuel tank level sensor (not shown) which constitutes a fuel sensor that detects a remaining fuel volume of the vehicle's fuel tank. In this case, the vehicle information system controller 14 can determine the DTE of the vehicle 10 in a manner similar to that described in copending U.S. patent application Ser. No. 12/701,638, referenced above.

The adjusted fuel economy value determining section 34 receives fuel economy data representing the determined fuel economy value from the fuel economy determining section 32 and modification factor data representing the modification factor from the modification factor determining section 30. The adjusted fuel economy value determining section 34 then determines an adjusted fuel economy value based on the fuel economy value data and the modification factor data, and outputs the adjusted fuel economy value. The adjusted fuel economy value can then be used to calculate the DTE as described, for example, in copending U.S. patent application Ser. No. 12/701,638, referenced above, or in any other suitable manner. The display section 36 of the vehicle information system controller 14 receives the adjusted fuel economy value from the adjusted fuel economy determining section 34 and controls displaying of information representing the adjusted fuel economy value and/or the DTE on the user display 16.

Further details of the operations of these sections of the vehicle information system controller 14 will now be described with regard to the flowchart in FIG. 4.

When the vehicle ignition is turned to an "ON" position and the vehicle's engine is started, the timers of the operational period determining section 26 and the movement period determining section 28 are enabled. If the vehicle 10 was last turned off in the middle of a monitoring period, the timers of the operational period determining section 26 and the movement period determining section 28 recover values stored at the time the vehicle 10 was turned off and logic proceeds from the last step of the flowchart in FIG. 4. Whenever the vehicle information system controller 14 begins a new monitoring period, logic in FIG. 4 restarts and proceeds to step S1. For example, the vehicle information system controller 14 may initiated a new monitoring period after every 1 km that the vehicle 10 travels. In step S1, the duration timer of the operational period determining section 26 and the movement timer of the movement period determining section 28 are cleared (e.g., set to "0" or null).

Then, in step S2, the movement period determining section 28 determines whether the vehicle transmission is in the "park" setting or is in one of the drive settings based on the transmission signal received from the vehicle transmission sensor 20. As discussed above, the movement period determining section 28 can also receive signals indicative of the status of an emergency brake and/or wheel brakes.

If the movement period determining section 28 determines in step S2 that the vehicle transmission is not in the "park" setting and the parking brake is not being applied, the processing proceeds to step S3. In step S3, the movement period determining section 28 starts the movement timer or allows the movement timer to continue running if it has already been started. Also in step S3, the operational period determining section 26 starts the duration timer or allows the duration timer to continue running if it has already been started.

In step S4, the vehicle information system controller 14 determines whether the monitoring period has been completed. If the monitoring period is not completed, the processing will return to step S2 and repeat as discussed above. However, if the movement period determining section 28 determines in step S2 that the vehicle transmission is in the "park" setting and/or the parking brake is applied, the processing will proceed from step S2 to step S5. In step S5, the movement period determining section 28 stops the movement timer if it is running or allows the movement timer to remain stopped if the movement timer is not running. However, as indicated in step S6, the operational period determining section 26 starts the duration timer or allows the duration timer to continue running if it has already been started.

Figure 4:
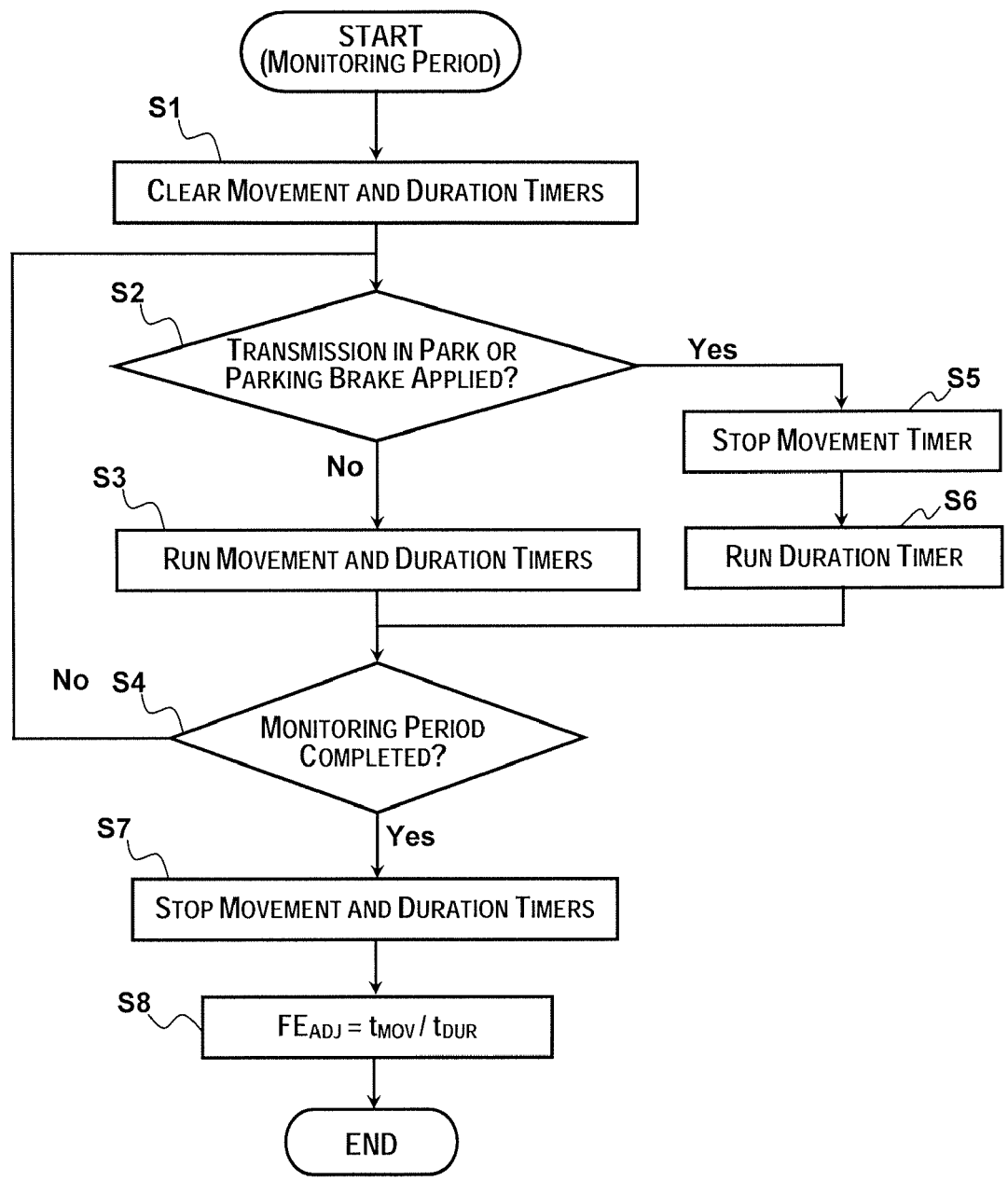
FIG. 4 is a flowchart illustrating an exemplary process executed by the vehicle information controller to determine a fuel economy adjustment or correction factor that can be used, for example, to compute an adjusted fuel economy value.

As can be appreciated from the flowchart in FIG. 4, during a given monitoring period the duration timer basically runs the entire time that the vehicle 10 is turned on. Therefore, the operational period determined by the operational period determining section 26 is at least partially based on an operational status of an ignition of the vehicle 10. However, during the same monitoring period, the movement timer only runs when the vehicle 10 is not parked (i.e., in motion). Therefore, the movement period determined by the movement period determining section 28 is a fraction of the operational period determined by the operational period determining section 26. Likewise, the movement timer is stopped at least whenever the vehicle 10 is parked. However, the movement timer may also be programmed to stop when the vehicle 10 is stationary but not necessarily parked (e.g., at a stop light).

From either step S3 or step S6, the processing proceeds to step S4 during which the vehicle information system controller 14 determines whether the monitoring period has been completed. For example, the vehicle information system controller 14 may determine in step S4 whether the vehicle has traveled a predetermined distance such as 1 km. However, those skilled in the art will appreciate that the vehicle information system controller 14 can also limit the monitoring period to a predetermined duration of time. If in step S4 the monitoring period is not completed, the processing will return to step S2 and repeat as discussed above. However, if the monitoring period is completed, the processing will proceed to step S7 where the operational period determining section 26 stops the duration timer and the movement period determining section 28 stops the movement timer.

Then in step S8, the vehicle information system controller 14 calculates the fuel economy adjustment factor $FE_{adj}$ as discussed above. The vehicle information system controller 14 uses the fuel economy adjustment factor $FE_{ADJ}$ to calculate the current adjusted fuel economy of the vehicle 10, which can then be used to calculate the DTE as described, for example, in copending U.S. patent application Ser. No. 12/701,638, referenced above, or in any other suitable manner. The process described above and shown in FIG. 4 is repeated for each monitoring period, and the fuel economy adjustment factor $FE_{ad}$ can thus be updated after each monitoring period completes.

As can be appreciated from the above, the vehicle information system and method according to embodiments of the present invention can improve the reliability of a DTE reading. The system and method query the fuel injection system of the vehicle 10 to determine the actual volume of fuel that was consumed during a given period. This can provide a more accurate indication of fuel consumption than a conventional fuel tank sensor. The system and method also consider whether or not the vehicle 10 was actually moving during a given period. Detected changes in fuel economy are selectively discounted based on a ratio of the amount of time that the vehicle was in motion to the total amount of time that the vehicle was running during the given period.

In understanding the scope of the present invention, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle information system operating method comprising:
   determining an operational period during which a vehicle is running;
   determining a movement period reflective of movement of the vehicle within a duration of the operational period; and
   operating a controller to determine determining a modification factor based on a ratio of the movement period to the operational period, determine a fuel economy value associated with fuel consumption and distance traveled throughout the duration of the operational period, determine an adjustment value based on the fuel economy value, a previous adjusted fuel economy value and the modification factor, and determine a current adjusted fuel economy value based on the previous adjusted fuel economy value and the adjustment value,
   wherein the difference between the current adjusted economy value and the previous adjusted economy value is limited to a product of the modification factor and a difference between the fuel economy value and the previous adjusted fuel economy value.

2. The method according to claim 1, wherein
the fuel economy value represents a distance-to-empty value of the vehicle.

3. The method according to claim 1, wherein
the determining of the fuel economy value is based on a signal output from a fuel injection controller.

4. The method according to claim 1, further comprising
displaying information representing the adjusted fuel economy value.

5. The method according to claim 1, wherein
the determining of the movement period includes starting a timer at a beginning of the operational period and stopping the timer whenever the vehicle is stationary.

6. The method according to claim 1, wherein
the movement period is a fraction of the operational period.

7. The method according to claim 1, wherein
the determining of the adjustment value includes determining a difference between the fuel economy value and the previous fuel economy value.

8. The method according to claim 1, wherein
the determining of the operational period is based on an operational status of an ignition of the vehicle.

9. The method according to claim 1, wherein
the determining of the operational period includes limiting the operational period to a duration of a predetermined monitoring period.

10. A vehicle information system controller comprising: a control unit including an operation period determining section, a movement period determining section, a modification factor determining section, a fuel economy determining section, an adjustment value determining section, and an adjusted fuel economy value determining section;
    the operational period determining section determines an operational period during which a vehicle is running;
    the movement period determining section determines a movement period reflective of movement of the vehicle within a duration of the operational period;
    the modification factor determining section determines a modification factor based on a ratio of the movement period to the operational period;

the fuel economy determining section determines a fuel economy value associated with fuel consumption and distance traveled throughout the duration of the operational period;

the adjustment value determining section determines an adjustment value based on the fuel economy value, a previous adjusted fuel economy value and the modification factor; and the adjusted fuel economy value determining section determines a current adjusted fuel economy value based on the previous adjusted fuel economy value and the adjustment value, wherein the difference between the current adjusted economy value and the previous adjusted economy value is limited to a product of the modification factor and a difference between the fuel economy value and the previous adjusted fuel economy value.

11. The vehicle information system controller according to claim 10, wherein the fuel economy value represents a distance-to-empty value of the vehicle.

12. The vehicle information system controller according to claim 10, wherein the fuel economy determining section determines the fuel economy value based on a signal output from a fuel injection controller.

13. The vehicle information system controller according to claim 10, further comprising a display section which controls displaying of information representing the adjusted fuel economy value.

14. The vehicle information system controller according to claim 10, wherein the movement period determining section further determines the movement period by starting a timer at a beginning of the operational period and stopping the timer whenever the vehicle is stationary.

15. The vehicle information system controller according to claim 10, wherein the movement period is a fraction of the operational period.

16. The vehicle information system controller according to claim 10, wherein the adjustment value determining section determines the adjustment value as a difference between the fuel economy value and the previous fuel economy value.

17. The vehicle information system controller according to claim 10, wherein the operational period determining section determines the operational period based on an operational status of an ignition of the vehicle.

18. The vehicle information system controller according to claim 10, wherein the operational period determining section limits the operational period to a duration of a predetermined monitoring period.

* * * * *